United States Patent
Ulevitch

(10) Patent No.: US 9,444,781 B2
(45) Date of Patent: *Sep. 13, 2016

(54) RECURSIVE DNS NAMESERVER

(71) Applicant: Cisco Technology, Inc., San Jose, CA (US)

(72) Inventor: David Ulevitch, San Francisco (CA)

(73) Assignee: Cisco Technology, Inc., San Jose, CA (US)

( * ) Notice: Subject to any disclaimer, the term of this patent is extended or adjusted under 35 U.S.C. 154(b) by 188 days.

This patent is subject to a terminal disclaimer.

(21) Appl. No.: 14/075,868

(22) Filed: Nov. 8, 2013

(65) Prior Publication Data

US 2014/0068051 A1    Mar. 6, 2014

Related U.S. Application Data

(63) Continuation of application No. 11/424,230, filed on Jun. 14, 2006, now Pat. No. 8,606,926.

(51) Int. Cl.
*H04L 29/12* (2006.01)

(52) U.S. Cl.
CPC ..... *H04L 61/2007* (2013.01); *H04L 29/12066* (2013.01); *H04L 29/12132* (2013.01); *H04L 61/1511* (2013.01); *H04L 61/1552* (2013.01)

(58) Field of Classification Search
None
See application file for complete search history.

(56) References Cited

U.S. PATENT DOCUMENTS

| | | | |
|---|---|---|---|
| 5,862,325 A * | 1/1999 | Reed | H04L 29/06 704/270.1 |
| 6,272,215 B1 * | 8/2001 | Cockrell | H04M 3/4228 379/219 |
| 6,411,966 B1 | 6/2002 | Kwan et al. | |
| 6,526,450 B1 | 2/2003 | Zhang et al. | |
| 6,643,707 B1 | 11/2003 | Booth | |
| 6,760,746 B1 | 7/2004 | Schneider | |
| 6,845,400 B2 | 1/2005 | Macpherson et al. | |
| 6,880,007 B1 | 4/2005 | Gardos et al. | |
| 6,976,090 B2 * | 12/2005 | Ben-Shaul | G06F 17/3089 707/E17.116 |
| 7,103,645 B2 | 9/2006 | Leighton et al. | |
| 7,194,522 B1 | 3/2007 | Swildens et al. | |
| 7,225,272 B2 | 5/2007 | Kelley et al. | |
| 7,228,359 B1 | 6/2007 | Monteiro | |
| 7,280,999 B2 | 10/2007 | Chung et al. | |
| 7,292,538 B1 * | 11/2007 | O'Rourke | G06Q 20/102 370/252 |
| 7,313,631 B1 | 12/2007 | Sesmun et al. | |
| 7,328,281 B2 | 2/2008 | Takeda et al. | |
| 7,334,048 B1 | 2/2008 | Guan et al. | |
| 7,334,049 B1 | 2/2008 | Somasundaram et al. | |

(Continued)

OTHER PUBLICATIONS

Notice of Allowance dated Dec. 4, 2013, U.S. Appl. No. 12/335,432, filed Dec. 15, 2008.

(Continued)

*Primary Examiner* — Ninos Donabed

(57) ABSTRACT

A recursive DNS server receives a request for domain name information associated with a domain name from a subscriber. In response to the request for domain name information, the recursive DNS nameserver determines a subscriber identifier and subscriber information associated with the subscriber identifier. The recursive DNS nameserver resolves the request for domain name information based on the subscriber information to generate a response to the request for domain name information. The recursive DNS nameserver then returns the response to the request for domain name information to the subscriber.

19 Claims, 13 Drawing Sheets

(56) References Cited

U.S. PATENT DOCUMENTS

| | | | |
|---|---|---|---|
| 7,376,897 B1* | 5/2008 | Mao | G06F 9/4443 715/708 |
| 7,406,538 B2 | 7/2008 | Berg | |
| 7,426,576 B1 | 9/2008 | Banga et al. | |
| 7,502,923 B2 | 3/2009 | Poyhonen et al. | |
| 7,505,921 B1* | 3/2009 | Lukas | G06Q 30/0603 705/26.5 |
| 7,559,085 B1 | 7/2009 | Wahl | |
| 7,831,697 B2 | 11/2010 | Fukushima | |
| 7,840,699 B2 | 11/2010 | Fujita et al. | |
| 8,082,451 B2 | 12/2011 | Waris | |
| 8,171,019 B2 | 5/2012 | Balogh | |
| 8,385,964 B2 | 2/2013 | Haney | |
| 2002/0010798 A1 | 1/2002 | Ben-Shaul et al. | |
| 2002/0027915 A1 | 3/2002 | Foti et al. | |
| 2002/0035639 A1 | 3/2002 | Xu | |
| 2004/0039798 A1 | 2/2004 | Hotz et al. | |
| 2004/0044791 A1 | 3/2004 | Pouzzner | |
| 2004/0250119 A1 | 12/2004 | Shelest et al. | |
| 2005/0010653 A1 | 1/2005 | McCanne | |
| 2005/0198386 A1 | 9/2005 | Accapadi et al. | |
| 2006/0062202 A1* | 3/2006 | Oesterling | H04L 29/06027 370/352 |
| 2006/0168335 A1* | 7/2006 | Hodjat | G06F 17/243 709/239 |
| 2006/0209174 A1* | 9/2006 | Isaac | H04N 21/41422 348/14.01 |
| 2006/0229889 A1* | 10/2006 | Hodjat | G06F 9/4443 709/202 |
| 2006/0245392 A1* | 11/2006 | Buckley | H04W 48/16 370/331 |
| 2007/0011168 A1* | 1/2007 | Keohane | G06F 17/30887 |
| 2007/0050711 A1* | 3/2007 | Walker | G06F 17/30855 715/205 |
| 2007/0061456 A1* | 3/2007 | Waris | G06F 21/6209 709/225 |
| 2007/0061725 A1* | 3/2007 | Isaac | H04N 7/17318 715/717 |
| 2007/0118639 A1* | 5/2007 | Bellifemine | H04L 29/06 709/224 |
| 2007/0118669 A1 | 5/2007 | Rand et al. | |
| 2007/0180090 A1 | 8/2007 | Fleischman et al. | |
| 2007/0204040 A1 | 8/2007 | Cox | |
| 2007/0294419 A1 | 12/2007 | Ulevitch | |
| 2008/0288470 A1 | 11/2008 | Goutard et al. | |
| 2009/0157889 A1 | 6/2009 | Treuhaft | |

OTHER PUBLICATIONS

Godin, Seth, "Oopstr," Article on "seth godin's blog" at http://sethgodin.typepad.com/seths_blog/2006/05/oopstr.html, downloaded from the Internet on Jun. 14, 2006 and indicated as posted on May 28, 2006.

Non-final Office Action dated Oct. 14, 2009, U.S. Appl. No. 11/424,230, filed Jun. 14, 2006.

Response to Office Action dated Apr. 14, 2010, U.S. Appl. No. 11/424,230, filed Jun. 14, 2006.

Final Office Action dated Jul. 8, 2010, U.S. Appl. No. 11/424,230, filed Jun. 14, 2006.

Response to Office Action dated Jan. 10, 2011, U.S. Appl. No. 11/424,230, filed Jun. 14, 2006.

Non-final Office Action dated Aug. 26, 2011, U.S. Appl. No. 11/424,230, filed Jun. 14, 2006.

Response to Office Action dated Feb. 24, 2012, U.S. Appl. No. 11/424,230, filed Jun. 14, 2006.

Final Office Action dated Aug. 8, 2012, U.S. Appl. No. 11/424,230, filed Jun. 14, 2006.

Response to Office Action dated Feb. 8, 2013, U.S. Appl. No. 11/424,230, filed Jun. 14, 2006.

Notice of Allowance and Fee(s) Due dated Aug. 5, 2013, U.S. Appl. No. 11/424,230, filed Jun. 14, 2006.

Non-final Office Action dated Aug. 18, 2010, U.S. Appl. No. 12/335,432, filed Dec. 15, 2008.

Response to Office Action dated Feb. 18, 2011, U.S. Appl. No. 12/335,432, filed Dec. 15, 2008.

Final Office Action dated Apr. 28, 2011, U.S. Appl. No. 12/335,432, filed Dec. 15, 2008.

Response to Office Action dated Oct. 28, 2011, U.S. Appl. No. 12/335,432, filed Dec. 15, 2008.

* cited by examiner

RECURSIVE DNS NAMESERVER

CLAIM OF PRIORITY

This application is a continuation application of U.S. patent application Ser. No. 11/424,230 filed Jun. 14, 2006, entitled "Recursive DNS Nameserver," by David Ulevitch, now U.S. Pat. No. 8,606,926, incorporated by reference herein in its entirety.

BACKGROUND OF THE INVENTION

The present invention relates to computer systems and more particularly to techniques for resolving requests for domain name information using a recursive DNS nameserver.

The Domain Name System or Domain Name Service (DNS) is a system that stores information, such as Internet Protocol (IP) addresses, associated with domain names. Domain names are names assigned to a computer host or groups of computer hosts. Typically, a domain name is made up of alphabetic characters and is easier to remember than a numeric IP address assigned to a computer host. The computer host or groups of computer hosts often provides network services such as web servers, email servers, application servers, and the like, accessible using the domain name.

Whenever an application uses a domain name when requesting network services, a DNS nameserver receives the request and translates the domain name into the corresponding IP address. For example, the domain name "www.cnet.com" might translate to 216.239.115.141. For any group of computer hosts in the DNS system there is likely to be a single master list of domain names and associated IP addresses. The group of computer hosts is called a zone. A zone could be a generic top-level domain (gTLD), such as "com," or a department within a company or university. Within the zone, DNS service for subsidiary zones may be delegated. The DNS nameserver that maintains the master list for the zone is said to have authority for that zone and is called an authoritative DNS nameserver.

Aside from an authoritative DNS nameserver, DNS nameserver functions are generally divided up into two elements: a nameserver and a resolver. The nameserver responds to DNS requests or queries by supplying domain name to IP address conversions. When the nameserver does not know the response to the request for domain name information, the resolver will ask another DNS nameserver, such as the authoritative DNS nameserver, for the information. Resolving usually entails recursing through several DNS nameservers, possibly until the root of the DNS name space is reached, to find the needed information. A recursive DNS nameserver typically is a computer system that processes DNS requests for domain names for which the recursive DNS nameserver is not authoritative.

FIG. 1 illustrates processing of a DNS request in the prior art. In this example, a user computer 105 makes a DNS request 110, for example for the IP address of the domain name "www.cnet.com," to an Internet Service Provider (ISP) DNS nameserver 120. The ISP DNS nameserver 120 is part of a group of ISP DNS nameservers 115. The ISP DNS nameserver 120 typically is a recursive DNS nameserver and communicates with several upstream DNS nameservers (e.g., root DNS nameservers 130) to resolve DNS requests.

In general, the ISP DNS nameserver 120 attempts to resolve the DNS request 110 from information stored in a local cache, which may be local cache shared by the group 115. The ISP DNS nameserver 120 maintains the local cache with domain name records that have already been resolved to improve performance in responding to subsequent DNS requests. A request for a domain name not contained in the local cache may result in overwriting of an existing cache entry, if the capacity of the local cache has been reached. One problem is that the size of the local cache for the group of ISP DNS nameservers 115 is generally too small compared to the size needed to store domain name information for all domains requested by computer hosts, such as the user computer 105. The benefit of having the local cache is lost when the user computer 105 makes requests for domain names from the ISP DNS nameservers 115, and the newly requested domain name records replace too quickly the domain name records in the local cache.

Another problem is that the ISP DNS nameservers 115 may not respect time-to-live information associated with a domain name record. The ISP DNS nameservers 115 can store a particular domain name record in the local cache for an extended time such that they respond to the user computer 105 with a stale or incorrect IP address for the requested domain. Additionally, the ISP DNS nameservers 115 can increase network traffic and reduce server response time by deleting or replacing the particular domain name record in the cache before such action is needed. The ISP DNS nameservers 115 then make unnecessary requests to other DNS nameservers for information that would otherwise be in the local cache.

Referring again to FIG. 1, if the ISP DNS nameserver 120 finds the requested domain name record in the local cache, the nameserver responds with the domain name record including the IP address of "www.cnet.com" in a DNS response 170 to the user computer 105. If the ISP DNS nameserver 120 is not able to locally resolve the DNS request 110, the ISP DNS nameserver 120 makes a DNS request 125 to root DNS nameservers 130. The root DNS nameservers 130, such as in the case of the Internet, are responsible for defining points of delegation in top level domains, such as "coin," "edu," and "net." The root DNS nameservers 130 can include multiple nameservers 135 and 140 that perform this function by providing a DNS response 145 with information that points the ISP DNS nameserver 120 to authoritative DNS nameservers 155 for the domain name "cnet.com."

The ISP DNS nameserver 120 then responds to the information 145 by sending a DNS request 150 to an authoritative DNS nameserver 160 for the domain name "www.cnet.com." The authoritative DNS nameserver 160 resolves the DNS request 150 for the domain name "www.cnet.com" and returns a DNS response 165 to the ISP DNS nameserver 120 with the IP address of the computer host(s) at "www.cnet.com." The ISP DNS nameserver 120 caches the DNS response 165 in the local cache for future use, and forwards the DNS response 165 received from the authoritative DNS nameservers 155 to the user computer 105 in the DNS response 170.

FIG. 2 is an illustration of the authoritative DNS nameserver 160 (FIG. 1) storing domain name records in the prior art. In this example, the authoritative DNS nameserver 160 is a typical computer system with a processor 210 coupled to a communications interface 220 and a storage 230 via a system bus 240. The communications interface 220 exchanges data with a communications network, such as the Internet, via line 250. The processor 210 receives DNS requests from the Internet and resolves the DNS requests based on domain name records, such as a DNS record 260 stored in the storage 230. The DNS record 260 includes a domain name 270, which is used as a key to lookup a corresponding IP address 280, and includes a time-to-live (TTL) value 290.

When the IP address 280 of a computer host changes or a particular network service is moved to a new computer host, a DNS administrator for the authoritative DNS nameserver 160 changes the IP address 280 associated with the domain name record 260 of the computer host. Thus, a user of the nameserver 160 can continue to access the computer host or particular network service by using the same domain name. Additionally, the DNS administrator for the authoritative DNS nameserver 160 can increase the TTL value 290 such that the domain name information persists longer in the local caches of a recursive DNS nameserver.

However, as discussed above, a recursive DNS nameserver may not respect the TTL value 290 due to inadequate resources, or the like. Another problem is that recursive DNS nameservers depend on the DNS administrator for the authoritative DNS nameserver 160 to properly administer and update the DNS record 260. If the DNS administrator does not update the DNS record 260 or the authoritative DNS nameserver 160 fails, the recursive DNS nameservers cannot access the DNS record 260 to provide reliable DNS services.

In light of the above, there is a need for techniques for resolving DNS requests using a recursive DNS nameserver that address some of the problems in the prior art.

BRIEF SUMMARY OF THE INVENTION

The present invention addresses some of the problems in the prior art by providing techniques for resolving requests for domain name information associated with a domain name using a recursive DNS nameserver. According to one technique, a request for domain name information associated with a domain name is received from a subscriber and, in response, a subscriber identifier and subscriber information associated with the subscriber identifier are determined. The request for domain name information is resolved based on the subscriber information to generate a response to the request for domain name information. The response to the request for domain name information is then returned to the subscriber.

In some embodiments, information associated with a domain name record for the domain name is obtained based on a determination that the local cache contains the domain name record. A substitute Uniform Resource Locator that satisfies a substitution criterion for the domain name in the request for domain name information may be obtained. The substitute Uniform Resource Locator may be obtained based on a determination that a local cache contains a domain name record for the domain name in the request for domain name information. The substitution criterion may specify an association between a Uniform Resource Locator in the request for domain name information that appears to be misspelled and the substitute Uniform Resource Locator. Further, the substitution criterion may specify an association between a Uniform Resource Locator in the request for domain name information and a referrer identifier in the substitute Uniform Resource Locator.

A system for processing DNS requests may retrieve the domain name information associated with the domain name from an authoritative nameserver. The system may store the response to the request for domain name information in a domain name record in a local cache. The system may determine ageing information associated with the domain name and store the ageing information in a domain name record in a local cache. The system then manages the expiration of the domain name record from the local cache in accordance with the ageing information.

In some embodiments, the system associates a flag with a domain name. The system then resolves the request for domain name information in response to the flag associated with the domain name and one or more preferences for resolving domain name requests in the subscriber information. The system may provide an indication in the response based on the one or more preferences in the subscriber information that the domain name in the request for domain name information is identified as a suspicious site. The system may also receive geographic location information related to the subscriber identifier, and resolve the request for domain name information based on the geographic location information related to the subscriber identifier.

A further understanding of the nature and the advantages of the inventions disclosed herein may be realized by reference of the remaining portions of the specification and the attached drawings.

DETAILED DESCRIPTION OF THE INVENTION

The present invention provides techniques for resolving requests for domain name information using a recursive DNS nameserver.

The embodiments discussed herein are illustrative of one or more examples of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, the present descriptions and drawings should not be considered in a limiting sense, as it is understood that the present invention is in no way limited to only the embodiments illustrated.

In general, a recursive DNS server receives a request from a subscriber or user for domain name information associated with a domain name. In response to the request for domain name information, the recursive DNS nameserver determines a subscriber identifier and subscriber information associated with the subscriber identifier. The recursive DNS nameserver resolves the request for domain name information based on the subscriber information to generate a response. The recursive DNS nameserver then returns the response to the subscriber, providing the resolved domain name information.

The domain name information can be any type of information associated with a domain name. Some examples of domain name information are resource records, such as "A" records used for storing a 32-bit IP address associated with a domain name, "AAAA" records used for storing an IPv6 128-bit address associated with a domain name, and "CNAME" or canonical name records for a DNS alias. A request for domain name information is any packet, cell, message, or signal used to ask for domain name information.

A response is any packet, cell, message, or signal used for transmitting domain name information. A Uniform Resource Locator (URL) identifies resources available through network hosts. Some examples of URLs are http—HTTP resources, https—HTTP over SSL, ftp—File Transfer Protocol, mailto—E—mail address, ldap—Lightweight Directory Access Protocol lookups, file—resources available on the local computer or over a local file sharing network, news—Usenet newsgroups, gopher—the Gopher protocol, telnet—the TELNET protocol, and data—the Data: URL scheme for inserting small pieces of content in place. Typically, a URL includes domain names that form a portion of the URL.

Figure 1:
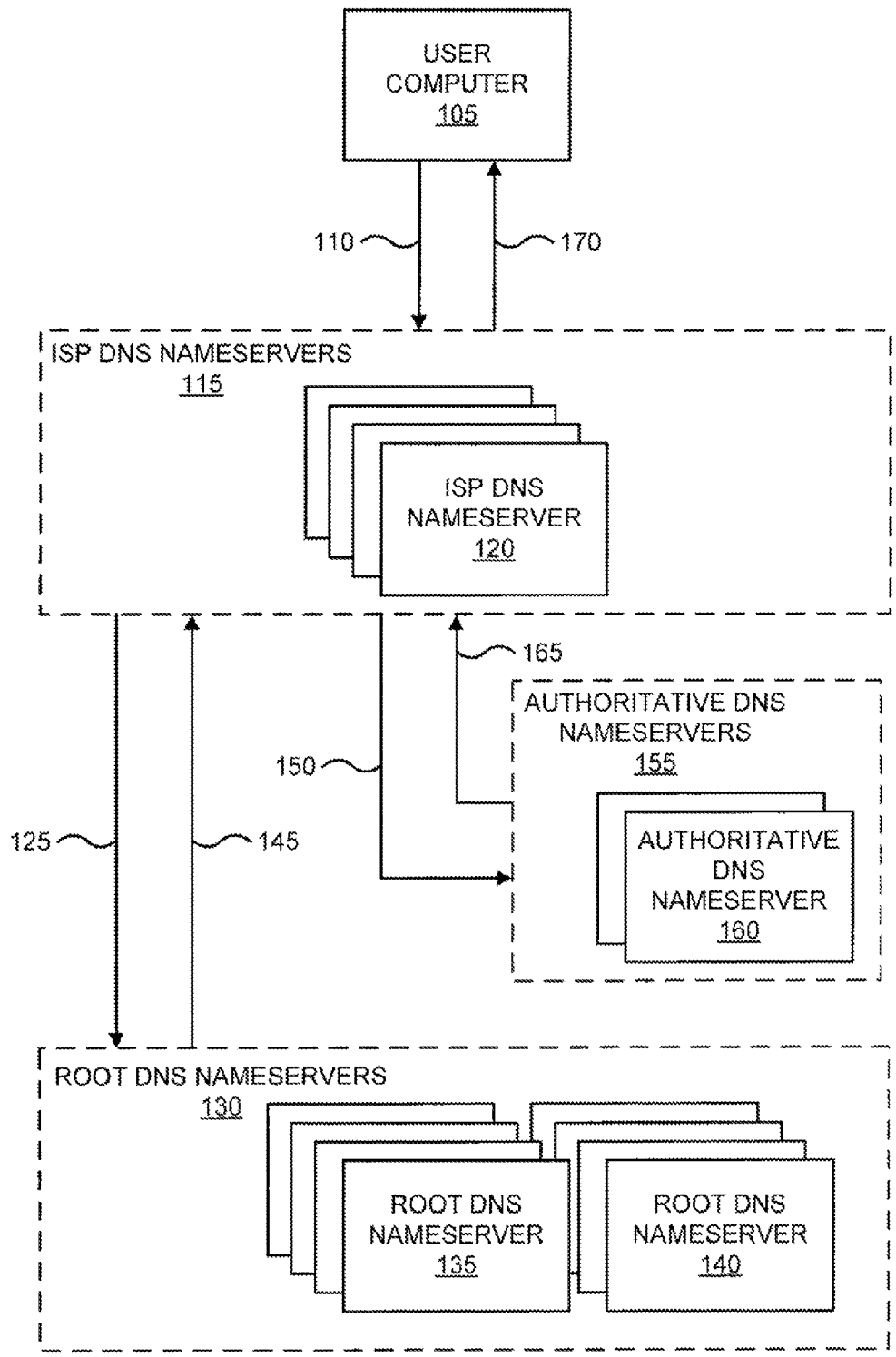
FIG. 1 illustrates processing of a DNS request in the prior art.
Figure 2:
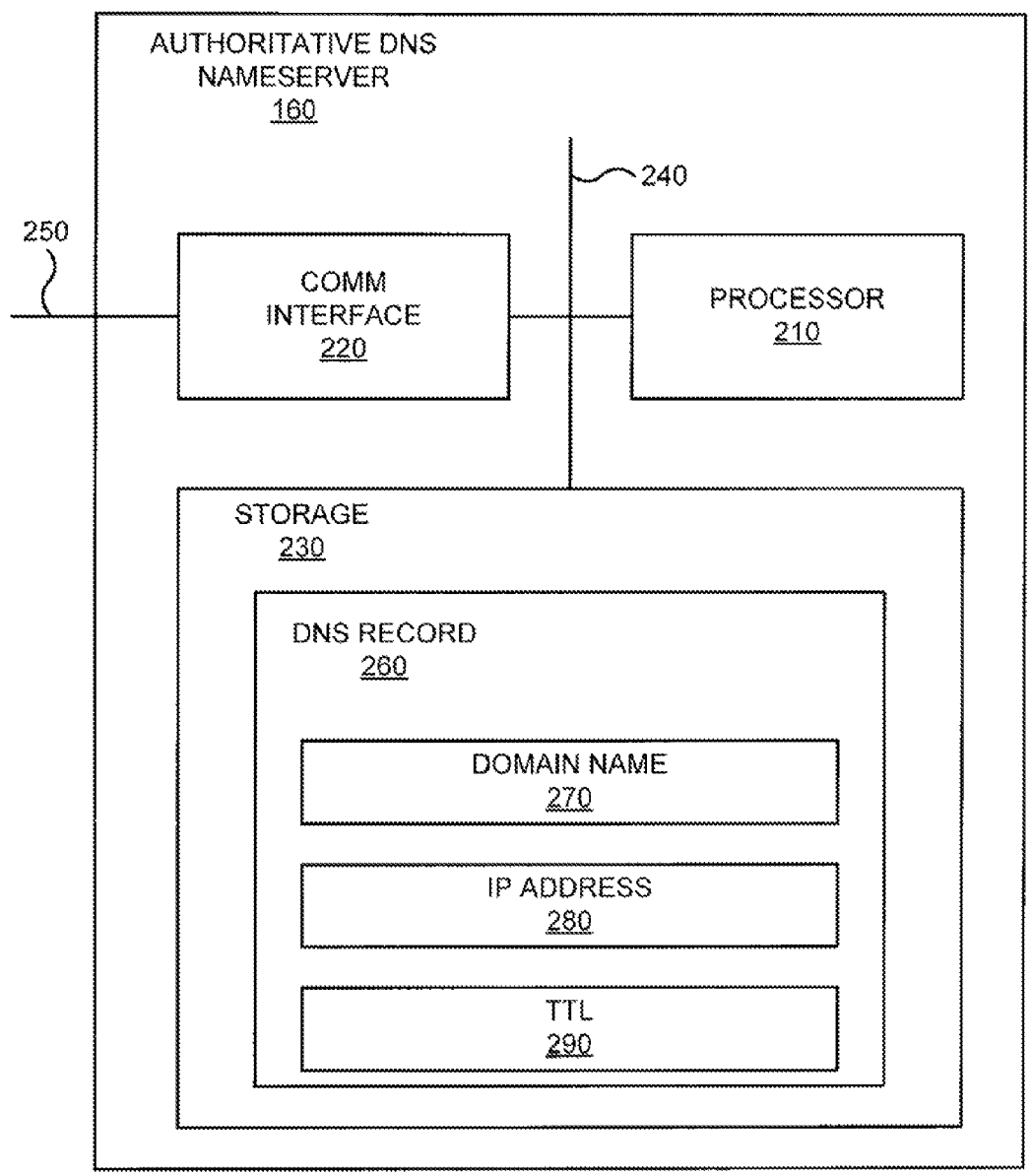
FIG. 2 is an illustration of an authoritative nameserver storing a domain name record in the prior art.
Figure 3:
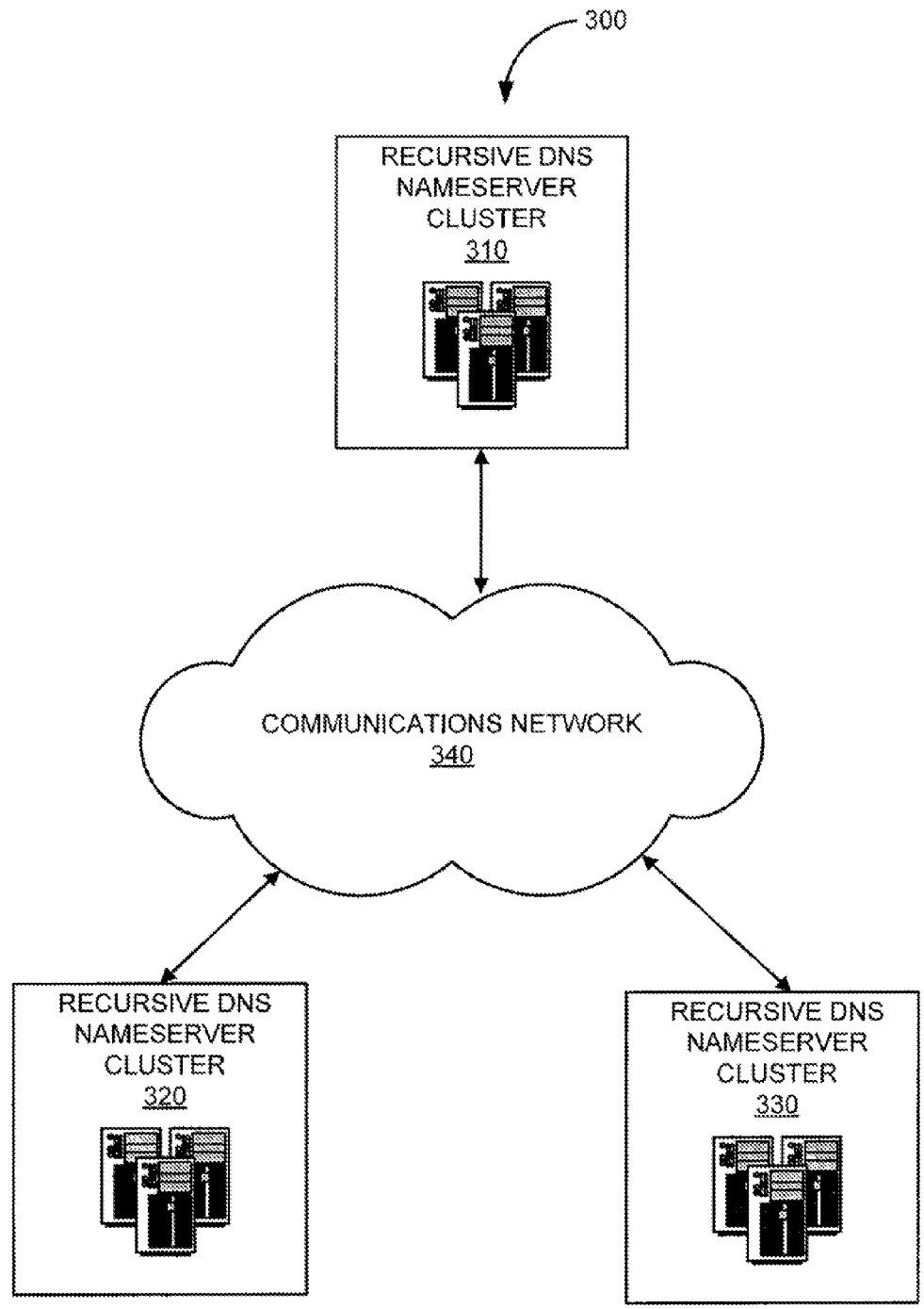
FIG. 3 is an illustration of a recursive DNS system in an exemplary implementation of the invention.

FIG. 3 is an illustration of a recursive DNS system 300 in an exemplary implementation of the invention. The recursive DNS system 300 includes recursive DNS nameserver clusters 310, 320, and 330, each of which communicates over a communications network 340, such as the Internet. A recursive DNS cluster (e.g., the recursive DNS cluster 310) can be any group, grid, or distributed platform of computer systems configured to respond to requests for domain name information. One example of the recursive DNS nameserver cluster 310 is described below in the discussion of FIG. 4.

In general, each of the recursive DNS nameserver clusters 310, 320, and 330 are distributed in different physical, geographic, and/or network locations to resolve requests for domain name information (DNS requests) from other computer systems (not shown) coupled to the communications network 340. The recursive DNS clusters 310, 320, and 330 are positioned in the different physical, geographic, and/or network locations to reduce latency and reduce response times for requests for domain name information. For example, a subscriber computer system located in San Francisco may be assigned to request domain name information from a recursive DNS nameserver cluster located in or near San Francisco, rather than a cluster located in New York or elsewhere. Advantageously, subscribers or users can be automatically directed to the "nearest" or closest recursive DNS cluster regardless of the subscriber's location.

In some embodiments, each of the recursive DNS nameserver clusters 310, 320, and 330 are assigned an anycast address. Anycast is a network addressing and routing scheme that allows data to be routed to the "nearest" or "best" destination. The nearest or best destination is typically determined by routing topologies. For example, on the Internet, anycast is usually implemented by using routers that communicate with the Border Gateway Protocol (BOP) to simultaneously announce the same destination network address range from many different places on the Internet. Simultaneously announce the same destination network address range results in packets addressed to anycast addresses in the destination network address range being routed to the "nearest" point or advertising router.

Typically, in anycast addresses, there is a one-to-many association between network addresses and network endpoints. Each destination address identifies a set of receiver endpoints, but one endpoint is generally chosen at any given time to receive information from a given sender. Anycast addresses may also include unicast, broadcast, and multicast addresses. Anycast is best suited to connectionless protocols (generally built on UDP such as the DNS protocol), although connection-oriented protocols such as TCP or UDP based protocols that keep their own state may be used.

Figure 4:
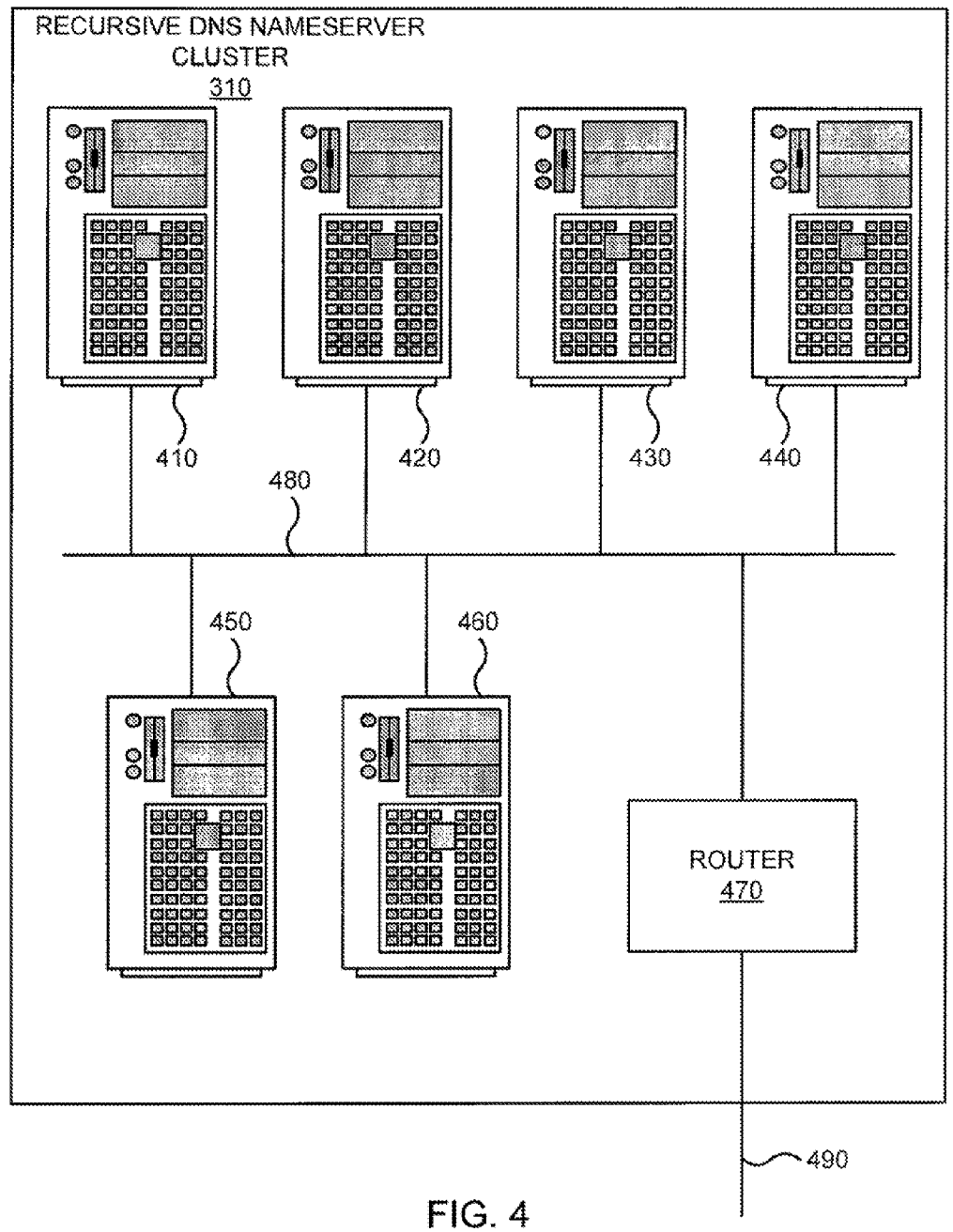
FIG. 4 is an illustration of an exemplary recursive DNS nameserver cluster in an exemplary implementation of the invention.

FIG. 4 is an illustration of the recursive DNS cluster 310 in an exemplary implementation of the invention. The recursive DNS cluster includes recursive DNS nameservers 410, 420, 430, 440, 450, and 460, and a router 470. The recursive DNS nameservers 410, 420, 430, 440, 450, and 460 are linked by a communications network 480 and communicate with the communications network 340 (FIG. 3) through the router 470 via a line 490.

A particular recursive DNS nameserver in the cluster 310 (e.g., the recursive DNS nameserver 410) can be any hardware and/or software elements configured to resolve requests for domain name information. One example of the recursive DNS nameserver 410 is described below in the description of FIG. 5. Other examples of the recursive DNS nameservers 410, 420, 430, 440, 450, and 460 may comprise personal computers, workstations, mainframes, and the like.

In operation, each of the recursive DNS nameservers 410, 420, 430, 440, 450, and 460 resolve requests for domain name information. In this example, each of the recursive DNS nameservers 410, 420, 430, 440, 450, and 460 provides part of a local cache for storing domain name information. That is, a portion of the local cache is stored in each of the recursive DNS nameservers 410, 420, 430, 440, 450, and 460. The local cache is described further below with respect to FIG. 6.

Figure 5:
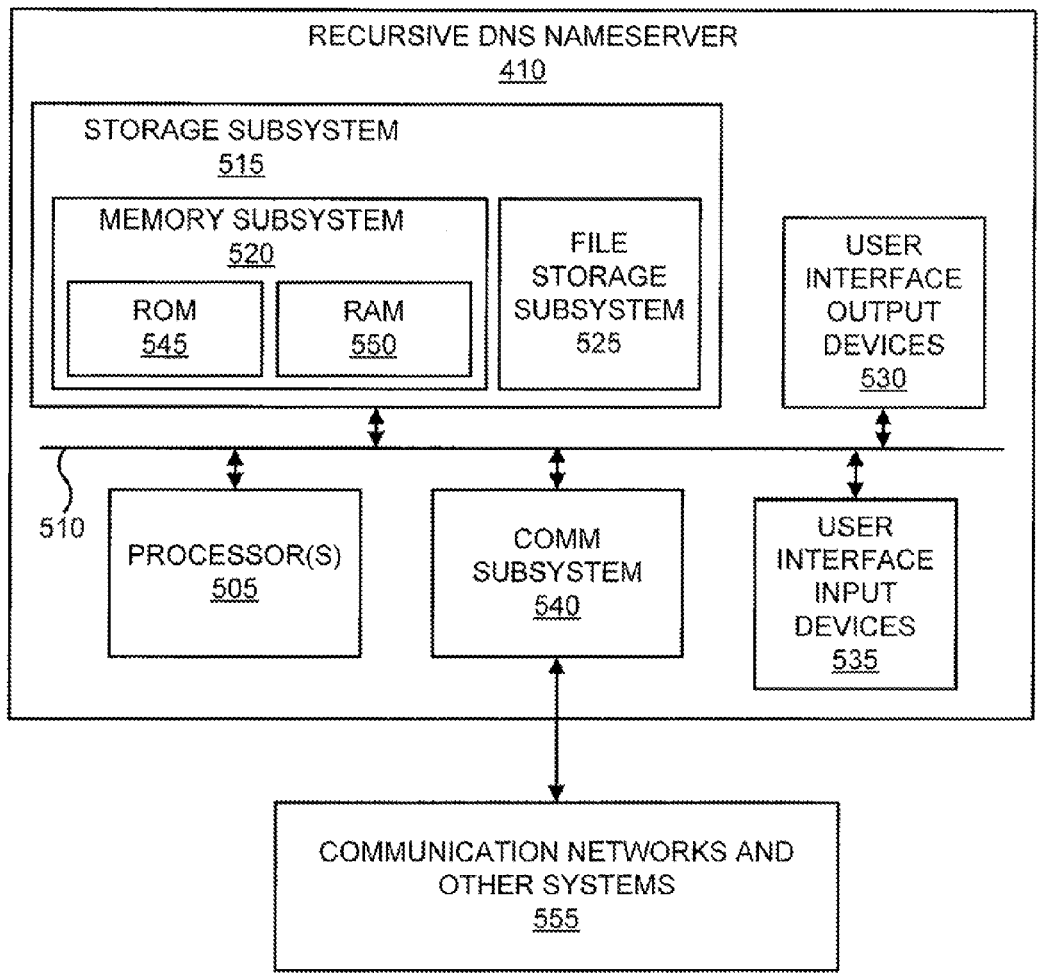
FIG. 5 is an illustration of an exemplary recursive DNS nameserver in an exemplary implementation of the invention.

FIG. 5 is an illustration of the recursive DNS nameserver 410 in an exemplary implementation of the invention. In the present embodiment, the recursive DNS nameserver 410 typically includes one or more processors 505, a system bus 510, storage subsystem 515 that includes memory subsystem 510 and file storage subsystem 525, user interface output devices 530, user interface input devices 535, a communications subsystem 540, and the like.

In various embodiments, the recursive DNS nameserver 410 typically includes conventional computer components such as the one or more processors 505, and memory storage devices, such as a read only memory (ROM) 545 and random access memory (RAM) 550 in the memory subsystem 520, and disk drives in the file storage subsystem 525.

In the illustrated embodiment, the user interface input devices 535 can comprise a variety of devices including a computer mouse, a trackball, a track pad, a joystick, wireless remote, drawing tablet, voice command system, eye tracking system, and the like. The user interface input devices 535 typically allow a user to select objects, icons, text and the like that appear on the user interface output devices 530 via a command such as a click of a button or the like.

Embodiments of the communication subsystem 540 typically include an Ethernet card, a modem (telephone, satellite, cable, ISDN), (asynchronous) digital subscriber line (DSL) unit, FireWire interface, USB interface, and the like. For example, the communications subsystem 540 may be coupled to the communications networks and other systems 555 (e.g., communications network 480), to a FireWire bus, or the like. In other embodiments, the communications subsystem 540 be physically integrated on the motherboard of the recursive DNS nameserver 410, may be a software program, such as soft DSL, or the like.

The RAM 550 and the file storage subsystem 525 are examples of tangible media configured to store data such as domain name information, embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In the present embodiment, the recursive DNS nameserver 410 may also include software that enables communications over a network (e.g., communications network 480 of FIG. 4) such as the DNS, TCP/IP, UDP/IP, and HTTP/HTTPS protocols, and the like. In alternative embodiments of the present invention, other communications software and transfer protocols may also be used, for example IPX, or the like.

It will be readily apparent to one of ordinary skill in the art that many other hardware and software configurations are suitable for use with the present invention. For example, the recursive DNS nameserver 410 may be a desktop, portable, rack-mounted, or tablet configuration. Additionally, the recursive DNS nameserver 410 may be a series of networked computers. Further, the use of other micro processors are contemplated, such as Pentium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board (e.g., a programmable logic device or graphics processor unit).

Figure 6:
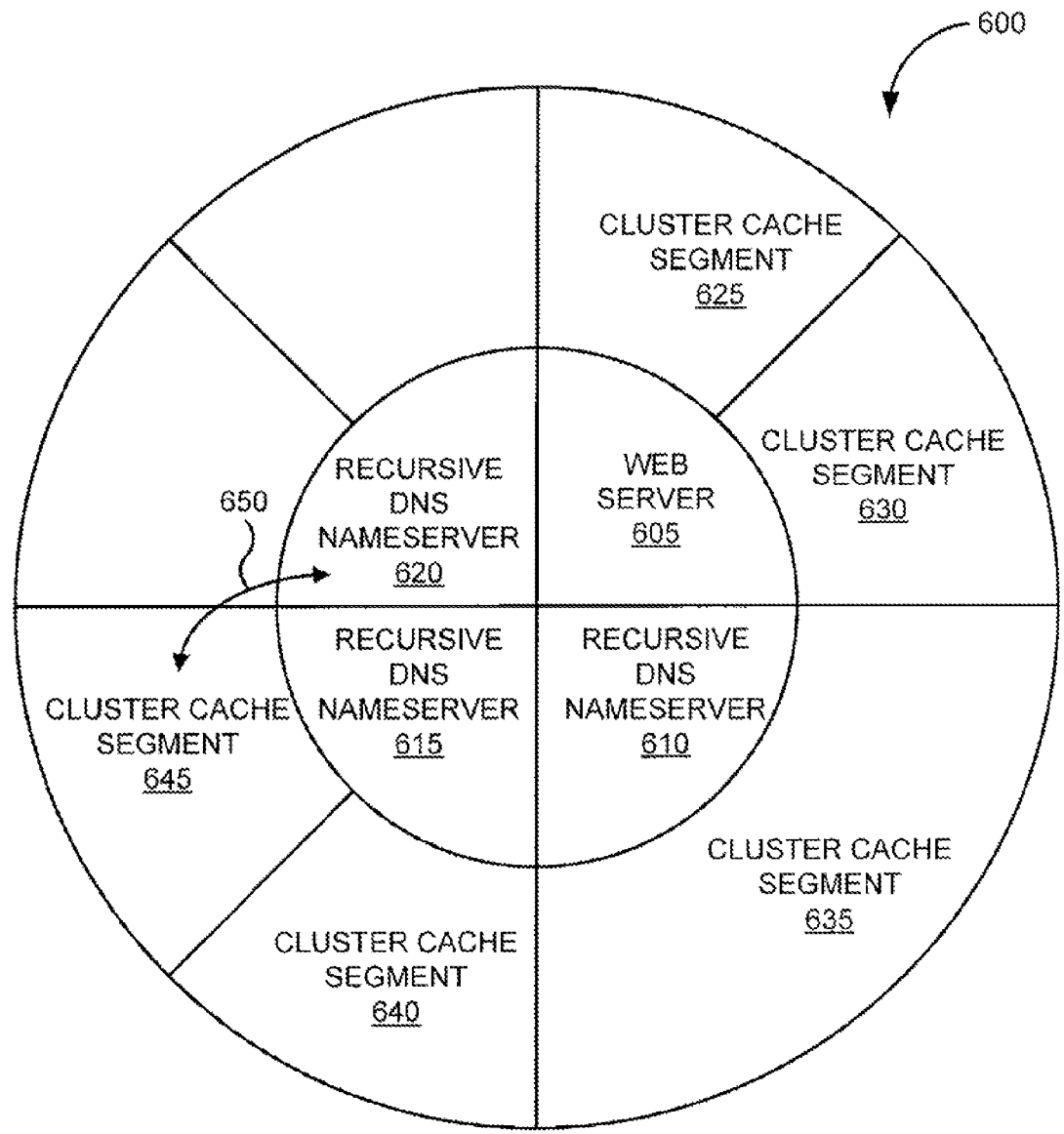
FIG. 6 is an illustration the composition of a local cache used by a recursive DNS cluster in an exemplary implementation of the invention.

FIG. 6 is an illustration of the composition of a local cache 600 used by a recursive DNS cluster (e.g., the recursive DNS nameserver 410) in an exemplary implementation of the invention. In the illustrated embodiment, a portion of the local cache 600 is distributed in RAM of a web server 605, and recursive DNS nameservers 610, 615, and 620. The web server 605 includes cluster cache segments 625 and 630. The recursive DNS nameserver 610 includes a cluster cache segment 635. The recursive DNS nameserver 615 includes cluster cache segments 640 and 645. The recursive DNS nameserver 620 does not include any cluster cache segments (represented by the blank segments).

The web server 605 and each of the recursive DNS nameservers 610, 615, and 620 have read/write access to any portion of the cluster cache segments 625, 630, 635, 640, and 645 hosted by the web server 605 and/or the recursive DNS nameservers 610, 615, and 620. In this example, the recursive DNS nameserver 620 performs an access operation 650 (such as a read or write operation) in the cluster cache segment 645 hosted by the recursive DNS nameserver 615.

It will be readily apparent to one of ordinary skill in the art that many other hardware and software configurations are suitable for use with the present invention. For example, in the present embodiment, the local cache may be in RAM of a single host computer providing access to one on or more virtual recursive DNS nameservers executing on the host computer system. In some embodiments, the cluster cache segments 625, 630, 635, 640, and 645 are stored in a storage area network (SAN) or in network-attached storage (NAS).

Moreover, the relationship between recursive DNS nameserver instances and cluster cache segments does not have to be one-to-one as illustrated in FIG. 6. In some embodiments, there are more cluster cache segments than recursive DNS nameservers. In other embodiments, there may be more recursive DNS nameservers than cluster cache segments. Additionally, the cluster cache segments are not limited to being hosted or stored in the recursive DNS nameservers.

Accordingly, in some embodiments, a portion of the local cache 600 can be replaced, or pre-loaded with domain name information. For example, if the recursive DNS nameserver 615 needs to go off-line for a scheduled maintenance or upgrade, the cluster cache segments 640 and 645 managed by the recursive DNS nameserver 615 can be backed up to a disk or tape drive. While the recursive DNS nameserver 620 is offline, the portion of the local cache 600 managed by the recursive DNS nameserver 620 is temporarily unavailable. When the recursive DNS server 620 goes online again, the backup is restored to the cluster cache segments 640 and 645 managed by recursive DNS nameserver 620. Additionally, the cluster cache segments 640 and 645 managed by the recursive DNS nameserver 615 may be transferred to the recursive DNS nameserver 620 to avoid any unavailability of domain name information.

In various embodiments, the computer systems that form the local cache 600 or other cache management systems perform one or more actions to ensure freshness of records and consistency of data in the local cache 600. In one example, the recursive DNS nameserver 610 proactively retrieves domain name information for domain name records before they expire. The recursive DNS nameserver 610 then refreshes the records in the local cache 600 which further removes latency involved when a user or subscriber requests an expired domain name record. The recursive DNS nameserver 610 may pre-fetch all or a portion of the locally cached domain name records. In some embodiments, the recursive DNS nameserver 610 tracks the "popularity" of domain name records. The recursive DNS nameserver 610 pre-fetches those domain name records with a higher popularity. This may be performed in real-time, such as using counter information associated with domain name record. The recursive DNS nameserver 610 may also analyze and parse log records to determine statistics for pre-fetching.

Figure 7:
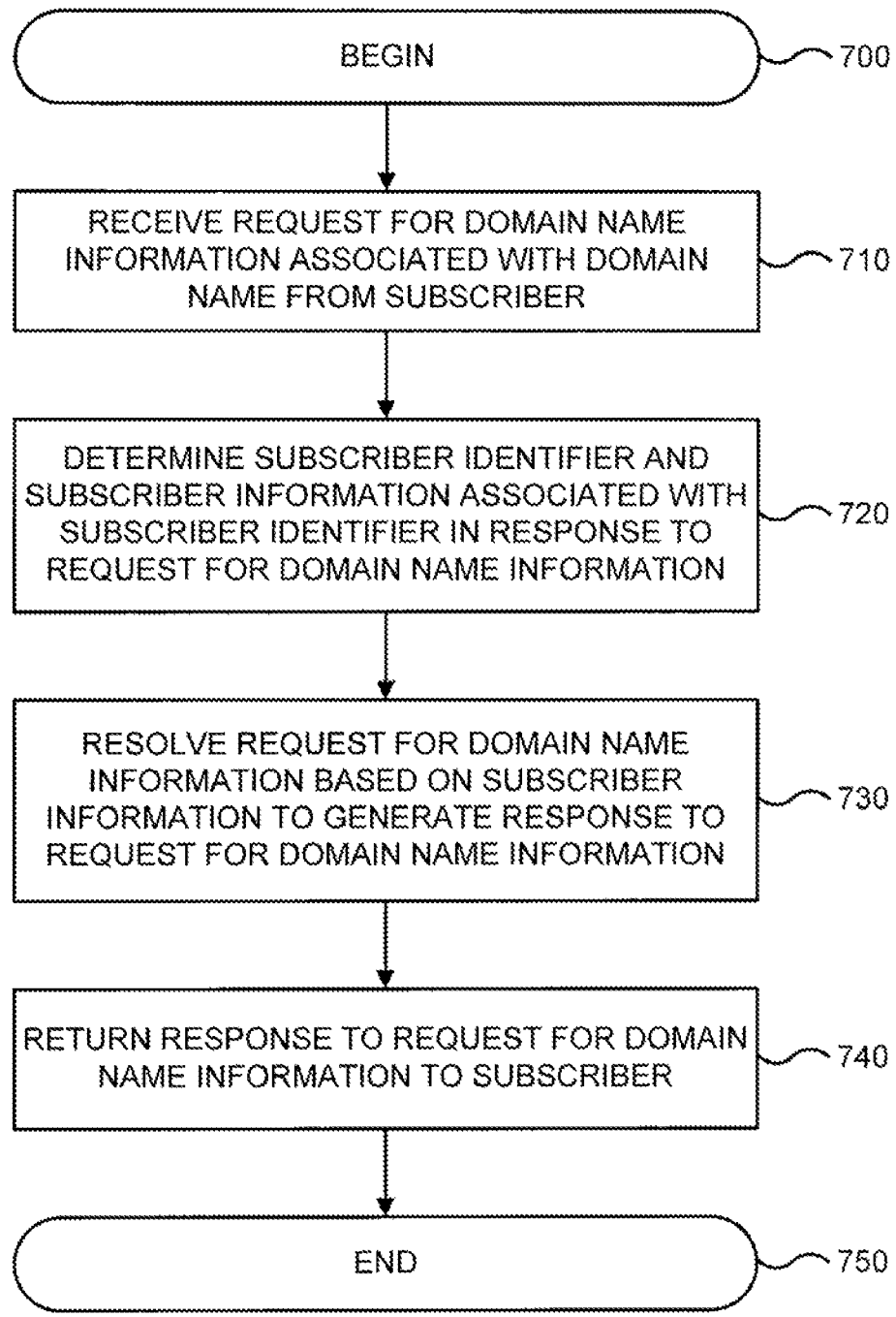
FIG. 7 is a flowchart for processing of a request for domain name information in an exemplary implementation of the invention.

FIG. 7 is a flowchart of operations performed by an exemplary nameserver 410 (FIG. 5) for processing of a request for domain name information in an exemplary implementation of the invention. The flowchart begins at the flowchart box 700. In the first operation, represented by the flowchart box numbered 710, the recursive DNS nameserver 410 receives a request from a user for domain name information associated with a domain name.

In the next operation, represented by the next box 720, the recursive DNS nameserver 410 determines a subscriber identifier and subscriber information associated with the subscriber identifier in response to the request for domain name information. A subscriber identifier is any information that discriminates the sender, owner, user, or subscribing entity associated with the request for domain name information. Some examples of a subscriber identifier are IP addresses, usernames, and secure tokens. Subscriber information is any information associated with the subscriber identifier that provides an indication to a recursive DNS server how to resolve requests for domain name information for the sender, owner, user, or subscribing entity associated with the request for domain name information. Some examples of subscriber information are preferences, rules, policies, regular expressions, and the like.

In general, one subscriber is an individual ad/or entity that agrees to service conditions of the operator of the recursive DNS nameserver 410. Such service conditions may include the payment of service subscription fees. Thus, a subscriber entity might agree to receive DNS processing services in accordance with payment of subscription fees and may then be permitted (through authorized users) to specify preferences, rules, and the like for processing of DNS requests from users who submit DNS requests through the subscribing entity. A user may be a subscriber and/or a user or computer system associated with a subscriber, such as an employee in the example of the corporate network. In one example, the subscriber is an individual home user that creates subscriber information based on personal browsing preferences.

In another example, one subscriber is an employer with a corporate network, who establishes subscriber information based on organization acceptable use policies related to the corporate network. In one example, the employer may prevent employees or internal networks to establish individual subscriber information, therefore each user, computer system, or network on the corporate network incorporates the subscriber information established by the employer. Another benefit provided by various embodiments is that the employer may allow certain "power users," computer systems, departments, or internal networks to establish separate subscriber information or add to the employer's subscriber information that is used for resolving domain name queries.

In a further example, one subscriber is a Wireless Internet Service Provider (ISP) with a wireless network. The Wireless ISP may establish subscriber information for resolving domain name queries originating from the wireless network based on terms-of-service policies, security features, user policies, and the like. The Wireless ISP may allow users of the wireless network to also establish individual subscriber information. The user's subscriber information may incorporate all or a portion of the Wireless ISP's subscriber information. This incorporation may be established by terms of the Wireless ISP, or the ISP may allow the user complete control of individual subscriber information. The Wireless ISP may allow some users to establish subscriber information independent of the Wireless ISP's subscriber information. Therefore, both the users and the Wireless ISP may be considered as subscribers.

In FIG. 7, the recursive DNS nameserver 410 inspects the network packet containing the request to determine the source IP address of the packet. The recursive DNS nameserver 410 then determines the subscriber information associated with the IP address of the packet. Additionally, other information, such as a username or secure token may be included in the request for domain information from which the recursive DNS nameserver 410 determines the subscriber identifier and the subscriber information.

In box 730, the recursive DNS nameserver 410 resolves the request for domain name information based on the subscriber information to generate a response to the request for domain name information. The operations of resolving the request for domain name information are described further below with respect to FIG. 8A and FIG. 8B.

In box 740, the recursive DNS nameserver 410 returns the response to the request for domain name information to the user. The flowchart of the DNS processing ends in box 750.

Figure 8A:
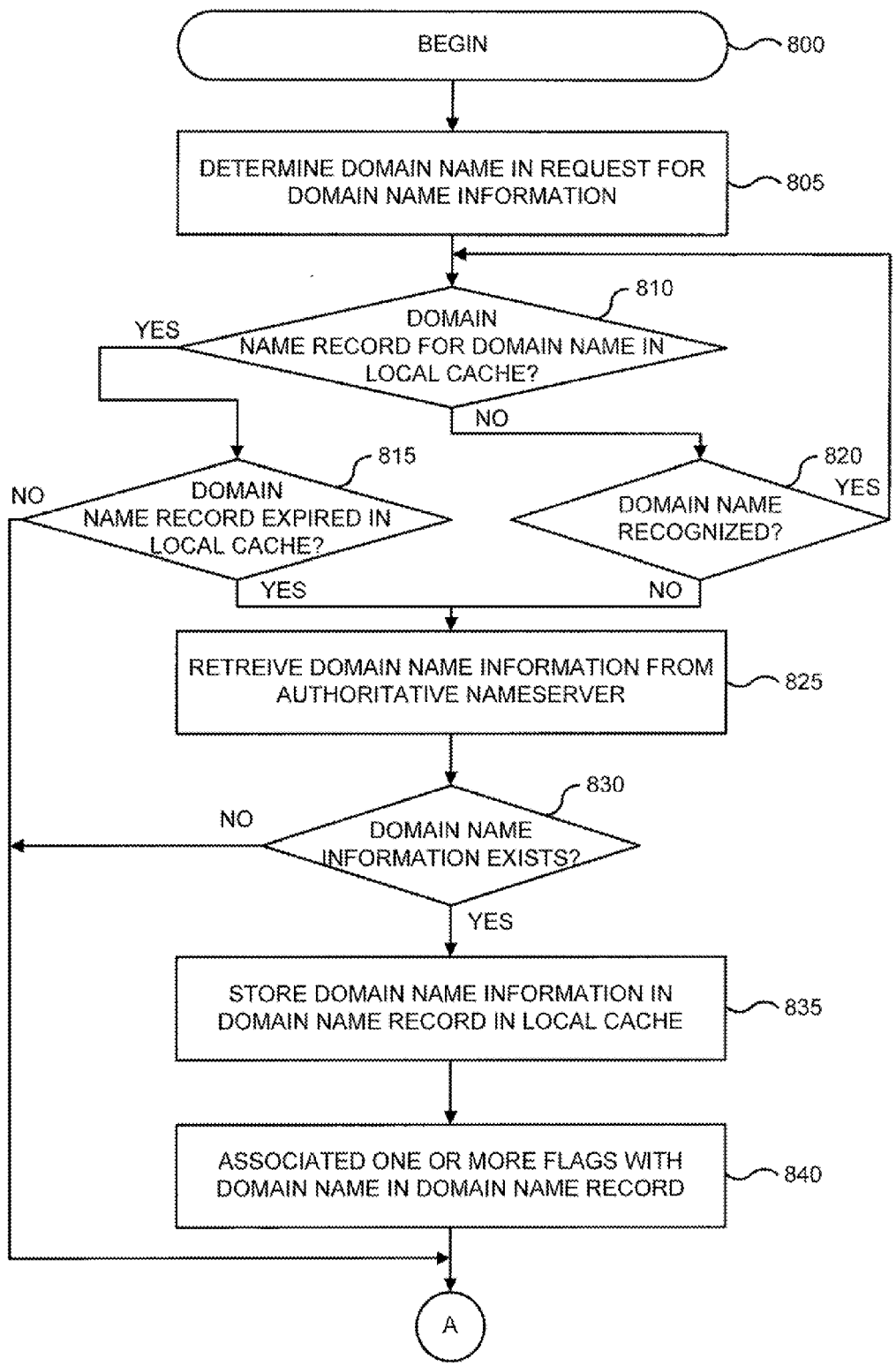
FIG. 8A and FIG. 8B are a flowchart for resolving the request for domain name information using subscriber information in an exemplary implementation of the invention.
Figure 8B:
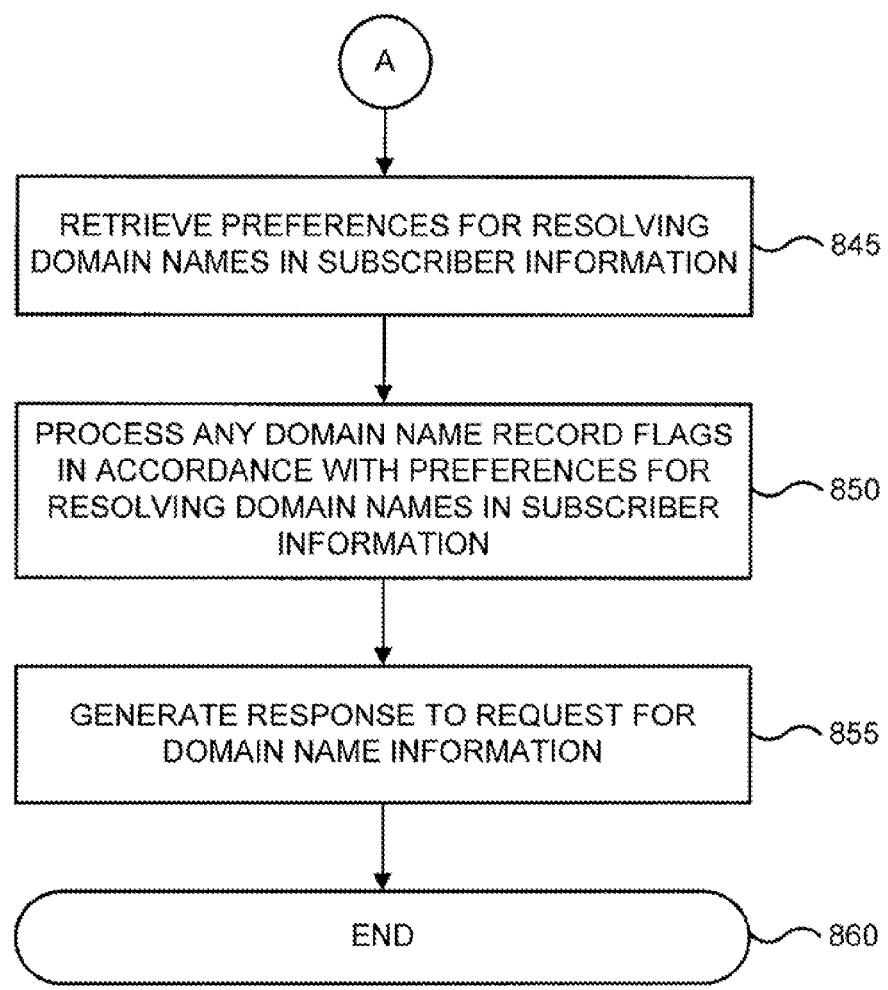

FIG. 8A and FIG. 8B are a flowchart for resolving the request for domain name information using subscriber information in an exemplary implementation of the invention. The flowchart begins in box 800. In box 805, the recursive DNS nameserver 410 determines the domain name in the request for domain name information.

In box 810, the recursive DNS nameserver 410 checks whether a domain name record for the domain name is in the local cache. If a domain name record for the domain name is not in the local cache, the recursive DNS nameserver 410 checks whether the domain name is recognized in box 820. Some examples of unrecognized domain names are domain names that are misspelled, malformed, unregistered, domain names with incorrect domain name information, and the like. If the recursive DNS nameserver 410 recognizes the domain name, for example, as a misspelled domain name, the recursive DNS nameserver 410 checks whether a domain name record for the proper domain name is in the local cache in step 810. If the recursive DNS nameserver 410 does not recognize the domain name, the recursive DNS nameserver 410 attempts to retrieve domain name information for the domain name from an authoritative DNS nameserver in box 825.

Returning to box 810, if a domain name record for the domain name is in the local cache, the recursive DNS nameserver 410 checks whether the domain name record in the local cache is expired in box 815. In this example, the recursive DNS nameserver 410 checks the time-to-live (TTL) portion of the domain name record to determine whether the domain name record has expired. If the TTL indicates that the domain name record has not expired, the flowchart continues on FIG. 8B. If the TTL indicates that the domain name record has expired, then the recursive DNS nameserver 410 attempts to retrieve domain name information for the domain name from other sources in box 825.

In some embodiments, the recursive DNS nameserver 410 employs ageing information, such as the TTL, to manage expiration of the domain name record in the local cache. For example, the recursive DNS nameserver 410 may prevent the TTL from being modified, such that the recursive DNS nameserver 410 maintains the domain name record for a longer period of time in the local cache. This can be useful when the authoritative DNS nameserver of the domain name is offline.

In one embodiment, the recursive DNS nameserver 410 adds a timestamp to the domain name record in the local cache when domain name information is received from an authoritative DNS nameserver. The recursive DNS nameserver 410 determines whether the domain name record is expired based on the time stamp and the TTL in the domain name record. The timestamp also allows any recursive DNS nameserver that reads the domain name record from the local cache to achieve the same determination of whether the domain name record is expired independent of external time indicators and location. For example, if the domain name record is expired in the local New York cache, the domain name record then is expired in the San Francisco cache and all other caches. In some embodiments, the timestamp reduce network traffic among the recursive DNS servers and may provide a means of pre-checking the domain name record.

In another example, the recursive DNS nameserver 410 manages the ageing information in order to provide a form of garbage collection, in cleaning out stale, or unwanted domain name record in the local cache.

In box 825, the recursive DNS nameserver 410 generates requests to one or more DNS nameservers to retrieve domain name information for the domain name. In one example, the recursive DNS nameserver 410 contacts the Internet root DNS nameservers to determine the authoritative DNS nameserver for the domain name. The recursive DNS nameserver 410 then contacts the authoritative DNS nameserver for the domain name to retrieve the domain name information for the domain name.

In box 830, the recursive DNS nameserver 410 checks whether the domain name information exists for the domain name. For example, the Internet root DNS nameservers may not include a delegation for the domain name. Additionally, the authoritative DNS nameserver for the domain name may be temporarily or permanently unavailable to respond to requests for domain name information. Furthermore, the domain name may simply not exist in the DNS. If the domain name information does not exist in box 830, the flowchart continues in FIG. 8A. If the domain name information does exists in box 830, the recursive DNS nameserver 410 stores the domain name information in a domain name record for the domain name in the local cache in box 835.

In box 840, the recursive DNS nameserver 410 associates one or more flags with the domain name in the domain name record. A flag is any indicator, marking, or symbol associated with a domain name. In the present embodiment, a flag is a binary indicator in the domain name record. One example of the use of flags in the domain name record is to mark a domain name that has been identified as a suspicious or untrustworthy site, such as a site engaged in phishing or pharming activities. A flag may also indicate a domain name that points to computers hosting illegal material, hate speech, or other material deemed inappropriate for children or for a particular age group or is otherwise objectionable to the subscriber.

Referring now to FIG. 8B, in box 845, the recursive DNS nameserver 410 retrieves preferences for resolving domain names in the subscriber information. A resolution preference is any information from a user or subscriber that indicates to the recursive DNS nameserver 410 how to generate a response to a request for domain name information. A preference may have one-to-one or a one-to-many mapping to flags associated with a domain name. In box 850, the recursive DNS nameserver 410 processes any domain name record flags in accordance with the resolution preferences in the subscriber information for resolving domain names.

For example, if the domain name is not recognized in box 820, a user or subscriber may set a preference where the recursive DNS nameserver 410 attempts to determine whether the domain name is misspelled. As discussed above, the domain name may be misspelled or otherwise malformed. Some examples of misspelled domain names include interchanged or transposed letters and numbers, grammatical mistakes in spelling, phonetically spellings, or dialectic alterations in words. Some examples of malformed domain names include using a comma instead of a period, using illegal characters, or missing characters in the top level domain (e.g., ".cm").

If the domain name is misspelled, the recursive DNS nameserver 410 then may generate the response with the proper domain name. The preference, or other preferences, may also have the recursive DNS nameserver 410 redirect the user or subscriber to a list of one or more potential domain names that correspond to the misspelled domain name. In some embodiments, the recursive DNS nameserver 410 redirects the user or subscriber to a web server hosting content that presents information relevant to the misspelled or malformed domain name. As such, the recursive DNS nameserver 410 may not provide direct information, but initiate the user or subscriber to request additional information from a network resource at another layer of the network (e.g., an application server or web page).

In box 855, the recursive DNS nameserver 410 generates the response to the request for the domain name information. The flowchart ends in box 860.

Figure 9:
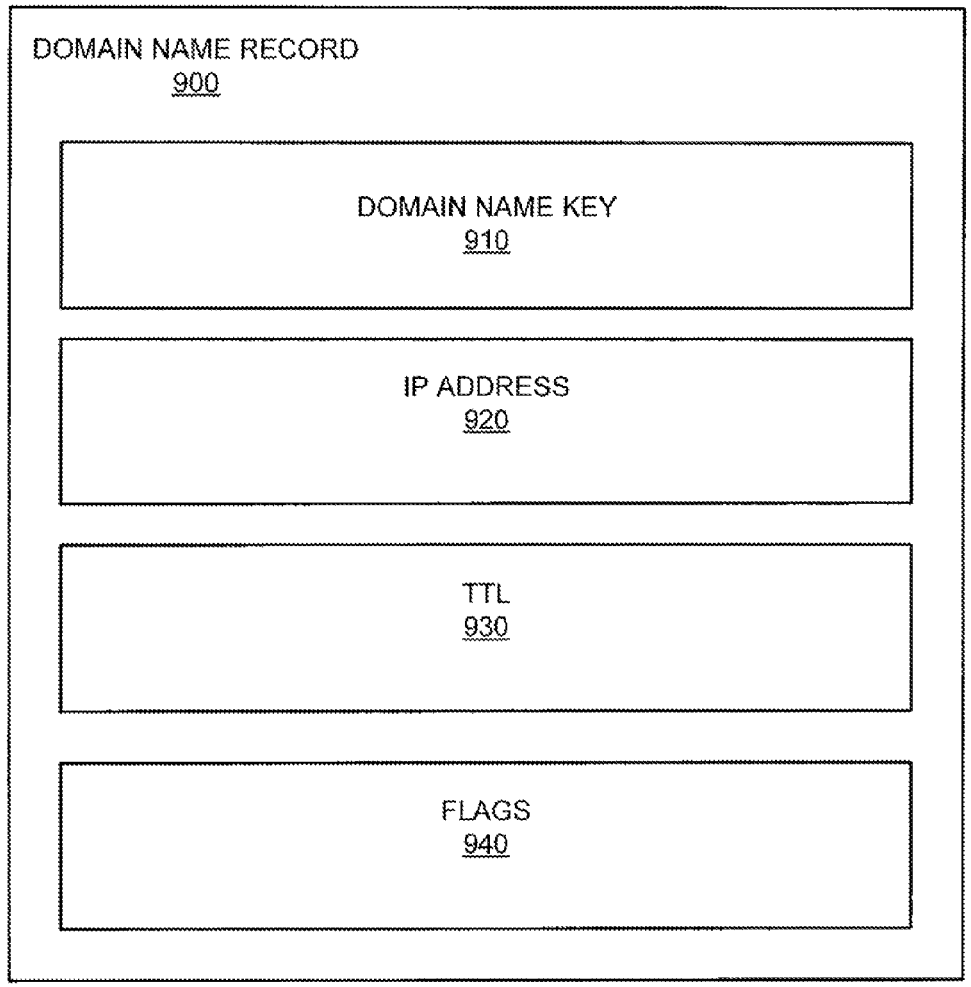
FIG. 9 is an illustration of a domain name record in an exemplary implementation of the invention.

FIG. 9 is an illustration of a domain name record 900 in an exemplary implementation of the invention. The domain name record 900 includes a domain name key 910, an IP address 920, a TTL 930, and a set of flags 940. The recursive DNS nameserver 410 stores the domain name record 900 in the local cache.

Figure 10:
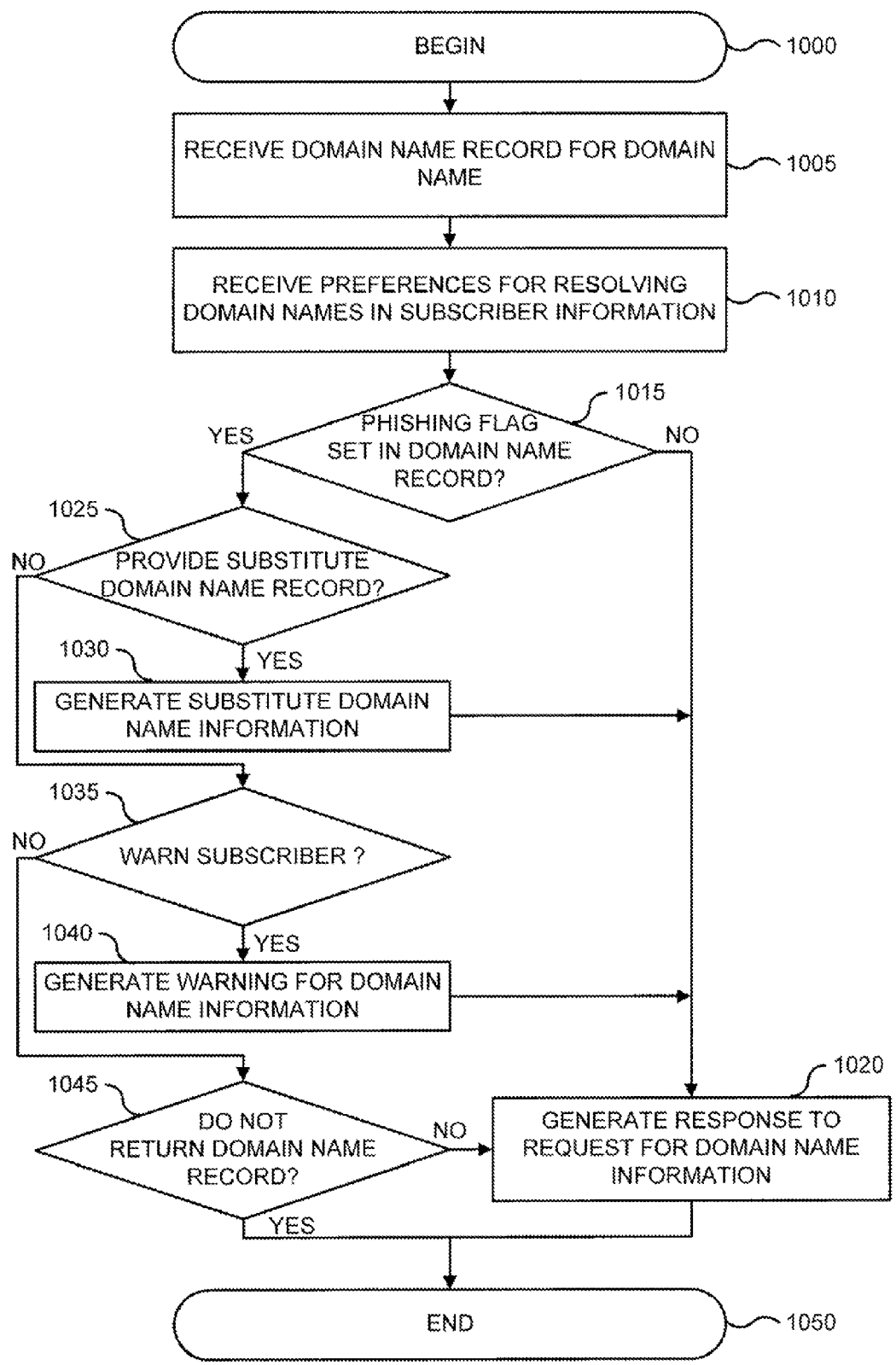
FIG. 10 is a flowchart for resolving the request for domain name information using subscriber information in an exemplary implementation of the invention.

FIG. 10 is a flowchart for resolving the request for domain name information using subscriber information in an exemplary implementation of the invention. The flowchart begins in box 1000. In box 1005, the recursive DNS nameserver 410 receives a domain name record for a domain name. In box 1010, the recursive DNS nameserver 410 receives preferences for resolving domain names in the subscriber information.

In box 1015, the recursive DNS nameserver 410 determines whether a phishing flag is set in the domain name record. A DNS administrator or user may set a flag in the domain name record of a domain name to indicate that the site appears to be suspicious or untrustworthy or otherwise requests personal and/or confidential information. If the phishing flag is not set, then the site is deemed trustworthy and the recursive DNS nameserver 410 generates the response to the request for domain name information in box 1020.

If the phishing flag is set in box 1015, the recursive DNS nameserver 410 then checks the preferences of the user or subscriber for resolving domain names when the phishing flag is set. In box 1025, the recursive DNS nameserver 410 checks whether to provide a substitute domain name record. In this example, the user prefers the recursive DNS nameserver 410 to provide a substitute domain name or URL that redirects the users to a different site or domain name. If the recursive DNS nameserver 410 is to provide a substitute domain name record in box 1025, the recursive DNS nameserver 410 generates substitute domain name information in box 1030. The substitute record, for example, can point to a warning page or other desired information.

If the user does not prefer to be redirected to a different domain name or URL, the recursive DNS nameserver 410 checks whether to warn the user in box 1035. In this example, the user may prefer to be warned that the domain name has been flagged as a phishing site, but still be allowed to proceed to the domain name after receiving a warning. In box 1040, the recursive DNS nameserver 410 then generates a warning for the domain name information. In some embodiments, the warning URL directs the user to a page that contains a warning and a link to the phishing site.

In box 1045, the recursive DNS nameserver 410 check whether to return the domain name information in the domain name record to the user. In this example, the user may not want to be redirected nor warned, but simply proceed to the phishing site. Additionally, the user may want to completely block access to phishing sites by indicated to the recursive DNS nameserver 410 to never return domain name information for domain names flagged as phishing sites.

If the recursive DNS nameserver 410 provides the substitute domain name record, the warning for the domain name information, or the actual domain name information of the phishing site the recursive DNS nameserver 410 generates the response to the domain name request accordingly in box 1020. If the recursive DNS nameserver 410 does not provide the domain name information, the recursive DNS nameserver 410 does not generate a response. The flowchart ends in box 1050.

Figure 11:
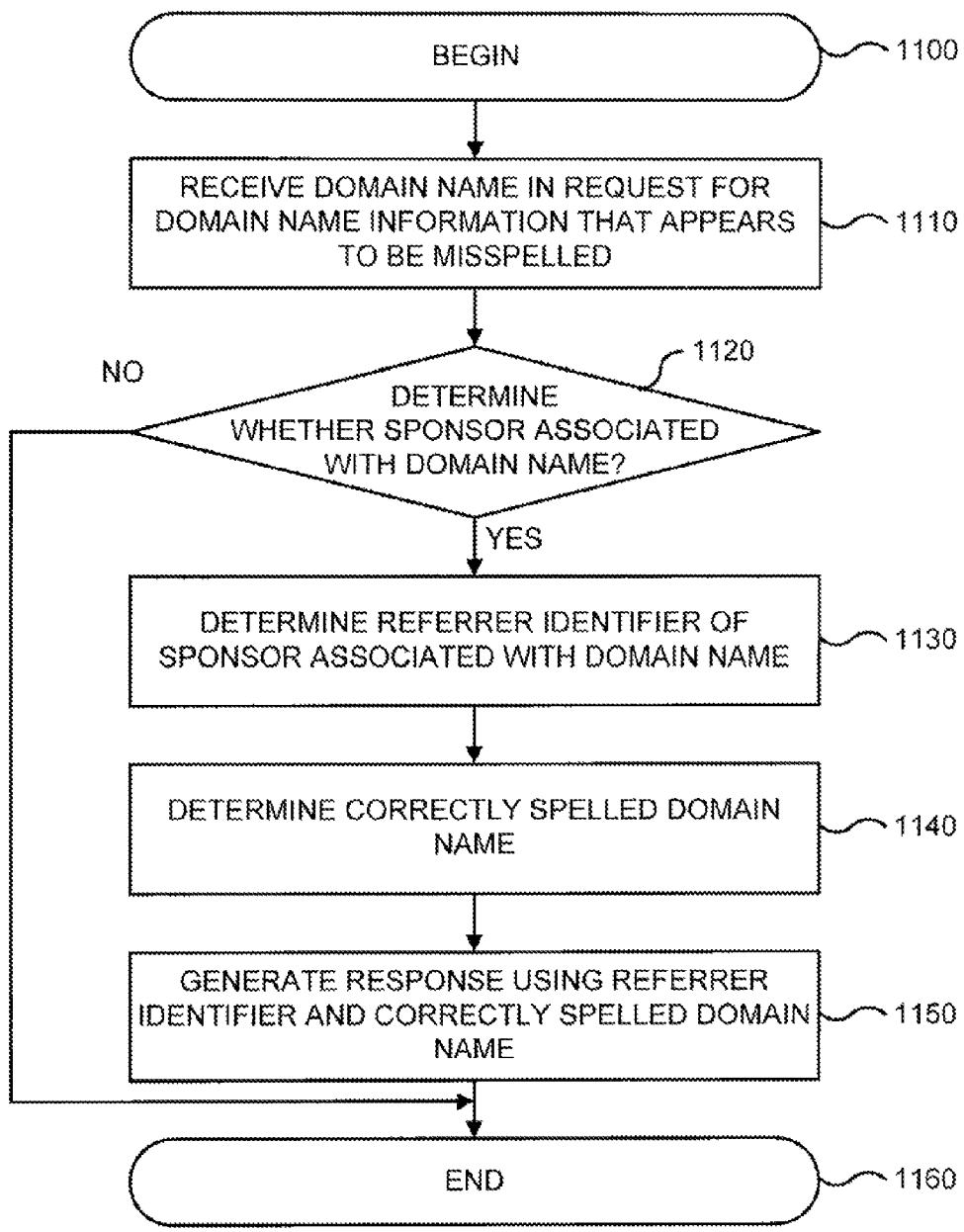
FIG. 11 is a flowchart for resolving a request for domain name information where a domain name appears to be misspelled using a referrer identifier in a substituted Uniform Resource Locator in an exemplary implementation of the invention.

FIG. 11 is a flowchart for redirecting a request for a domain name that appears to be misspelled using a referrer identifier in a substituted Uniform Resource Locator in an exemplary implementation of the invention. The flowchart begins in box 1100. In box 1110, the recursive DNS nameserver 410 receives a domain name in a request for domain name information that appears to be misspelled.

In box 1120, the recursive DNS nameserver 410 determines whether a sponsor is associated with the domain name in the request for domain name information. The sponsor can be any individual or organization that associates the misspelled domain name in the request with a substitute domain name. The recursive DNS nameserver 410 may determine more than one sponsor, and select a sponsor according to a predetermined scheme.

Typically, the substitute domain name is correct spelling of the misspelled domain name in the request. In some embodiments, the substituted domain name is a different domain name or URL than expected in request. If the recursive DNS nameserver 410 does not determine the sponsor of the misspelled domain name in box 1120, the flowchart ends in box 1160.

If the recursive DNS nameserver 410 determines the sponsor, the recursive DNS nameserver 410 determines a referrer identifier of the sponsor associated with the misspelled domain name. In box 1140, the recursive DNS nameserver 410 determines the correctly spelled domain name (or the substituted domain name or URL).

In box 1150, the recursive DNS nameserver 410 generates the response to the request for domain name information using the referrer identifier and the correctly spelled domain name. For example, if the request for domain name information included the misspelled domain name "amazon.cm," the recursive DNS nameserver 410 returns the response such that the user is directed to the correctly spelled domain name "amazon.com" with the addition of a referrer identifier. The substitute URL would appear as "http://www.amazon.com/exec/obidos/redirect-home/{referrerID}." The flowchart ends in box 1160.

In some embodiments, the recursive DNS nameserver 410 determines whether a keyword is associated with the domain name in the request for domain name information. A keyword is any word, phrase, or combination of characters associated with a domain name or URL. The keyword can be any part of the domain name, URL, or content accessed by the domain name.

In one example, a sponsor may use the recursive DNS server 410 to service a corporate network. In this example, the sponsor and the subscriber are the same entity. The sponsor may purchase, reserve, or otherwise request the keyword "amazon." When the keyword "amazon" is included in DNS requests originating from the corporate network, the sponsor/subscriber may want to redirect those requests to the Barnes and Noble website at "www.bn.com." Advantageously, the sponsor may receive revenue from purchases made from the Barnes and Noble website using a referrer identifier as previously discussed.

As discussed above, the recursive DNS nameserver 410 generates the response to the request for domain name information based on the keyword and the sponsor/subscriber information. The recursive DNS server 410 provides the sponsor/subscriber with a fast, low-latency DNS service that also provides a way to increase security of the corporate network and capture revenue from traffic originating from within the corporate network. The keyword provides one form of resolving domain name information based on the sponsor/subscriber information.

In another example, a service provider uses the recursive DNS server 410 to provide DNS services for clients of the service provider that access the service providers wireless network. The service provider can sponsor, register, or otherwise reserve keywords, misspelled or malformed domain names, and URLs using the recursive DNS server 410. The service provider can then capture revenue from traffic originating from the wireless network based on the recursive DNS server 410 resolving DNS queries using the keywords, referrer identifiers, etc. in response to the subscriber information established by the service provider. This may also provide a revenue subsidy to the service provider where the service provider allows open and free connections to the wireless network.

Figure 12:
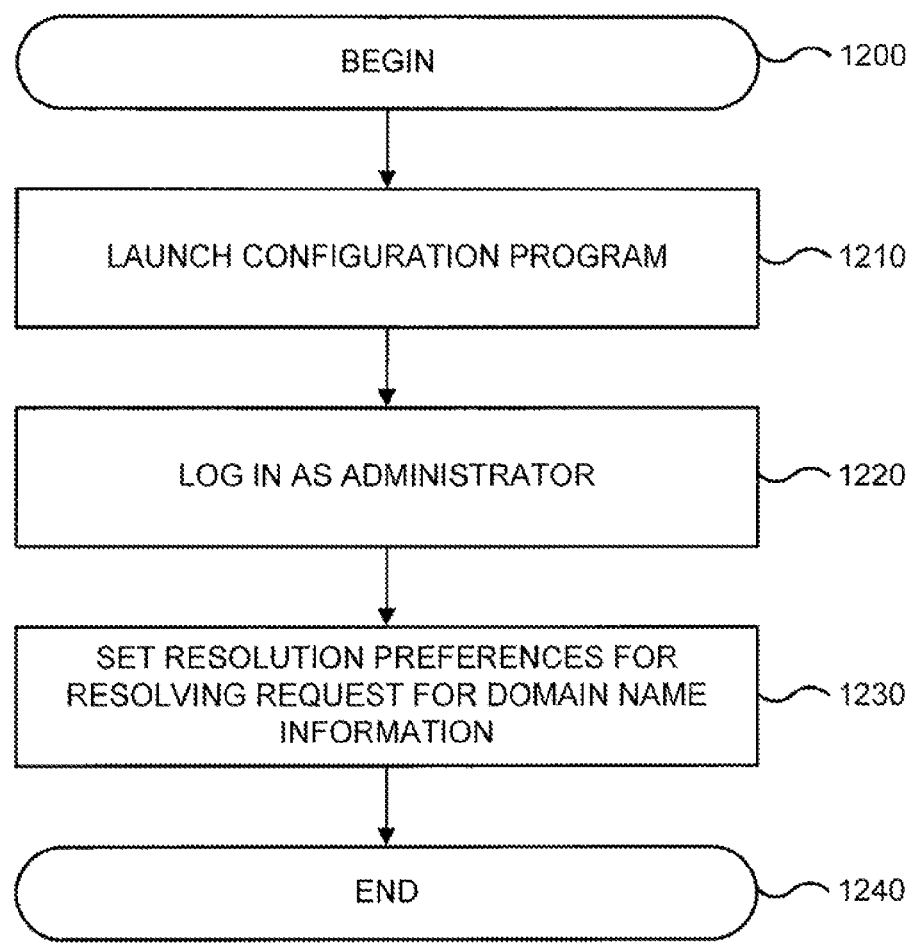
FIG. 12 is a flowchart for setting resolution preferences for resolving requests for domain name information in an exemplary implementation of the invention.

FIG. 12 is a flowchart for setting resolution preferences for resolving requests for domain name information in an exemplary implementation of the invention. The flowchart begins in box 1200. In box 1210, a user or subscriber launches a configuration program. A configuration program can be a computer program, web page, or web browser-based application.

In box 1220, the user or subscriber logs into the configuration program as an administrator. The administrator can administer information for a particular user, or a group of users. In box 1230, the administrator sets preferences for resolving requests for domain name information. For example, the administrator may check a box selecting predefined preferences. In another example, the administrator may create rules using a programming or scripting language. The flowchart ends in box 1240.

The present invention can be implemented in the form of control logic in software or hardware or a combination of both. The control logic may be stored in an information storage medium as a plurality of instructions adapted to direct an information-processing device to perform a set of steps disclosed in embodiments of the present invention. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A computer-implemented method of processing Domain Name System requests, the method comprising:
    storing at a DNS nameserver domain name records for a plurality of domain names associated with a plurality of different owners;
    storing preferences provided by a subscriber that indicate how to resolve requests that are associated with the subscriber for domain name information from the DNS nameserver, the preferences applying across the plurality of domain names and including a substitution criterion for domain name records associated with a first flag;
    receiving at the DNS nameserver from the subscriber a request for domain name information for a first domain name associated with a first domain name record;
    receiving geographic location information related to the subscriber; in response to the request, determining the preferences provided by the subscriber and the first domain name record;
    in response to the first domain name record including the first flag, resolving the request for domain name information by obtaining substitute domain name information that satisfies the substitution criterion, wherein resolving the request for domain name information is based on the geographic location information related to the subscriber; and
    generating a response to the request including the substitute domain name information in place of domain name information from the first domain name record.

2. The computer-implemented method of claim 1, the method further comprising:
    storing preferences for each of a plurality of subscribers, the preferences for each subscriber including an indication of how to resolve requests for domain name information associated with one or more flags.

3. The computer-implemented method of claim 2, wherein:
    the first flag indicates an association with suspicious activity; and
    the substitute domain name information is unaffiliated with the first domain name.

4. The computer-implemented method of claim 3, wherein generating the response to the request includes:
    based on the preferences associated with a first subscriber of the plurality of subscribers, generating an indication in the response to the request that the first domain name is associated with suspicious activity.

5. The computer-implemented method of claim 1, wherein: resolving the request includes obtaining a substitute Uniform Resource Locator that satisfies the substitution criterion.

6. The computer-implemented method of claim 5, wherein the substitution criterion specifies an association between a Uniform Resource Locator in the request for domain name information that appears to be misspelled and the substitute Uniform Resource Locator.

7. The computer-implemented method of claim 5, wherein the substitution criterion specifies an association between a Uniform Resource Locator in the request for domain name information and a referrer identifier in the substitute Uniform Resource Locator.

8. A nameserver, comprising:
    a communications interface configured to exchange data with a communications network;
    a storage device maintaining domain name records for a plurality of domain names associated with a plurality of different owners, the one or more storage devices maintaining preferences provided by a subscriber that indicate how to resolve requests from the subscriber for domain name information from the nameserver, the preferences applying across the plurality of domain names and including a substitution criterion for domain name records associated with a first flag; and
    a processor coupled to the communications interface and the storage device, the processor is configured to receive a request from the subscriber for domain name information of a first domain name associated with the first flag and geographic location information related to the subscriber, and to determine the preferences provided by the subscriber in response to the request, the processor is configured to resolve the request by obtaining substitute domain name information that satisfies the substitution criterion and based on the geographic location information related to the subscriber and to generate a response to the request including the substitute domain name information in place of domain name information for the first domain name.

9. The nameserver of claim 8, wherein:
    the subscriber is a first subscriber; and
    the storage device maintains a subscriber identifier and subscriber information for a plurality of subscribers including the first subscriber, the subscriber information including preferences for each subscriber, the preferences for each subscriber including an indication of how to resolve requests for domain name information associated with one or more flags.

10. The nameserver of claim 9, wherein:
    the first flag indicates an association with suspicious activity; and
    the substitute domain name information is unaffiliated with the first domain name.

11. The nameserver of claim 8, wherein:
    resolving the request includes obtaining a substitute Uniform Resource Locator that satisfies the substitution criterion.

12. The nameserver of claim 11, wherein the substitution criterion specifies an association between a Uniform Resource Locator in the request for domain name information that appears to be misspelled and the substitute Uniform Resource Locator.

13. The nameserver of claim 11, wherein the substitution criterion specifies an association between a Uniform Resource Locator in the request for domain name information and a referrer identifier in the substitute Uniform Resource Locator.

14. A computer program product embodied on a tangible non-transitory computer readable medium containing instructions executable by a computer, the executable instructions comprising:
    code for storing domain name records for a plurality of domain names, the plurality of domain name records including a first domain name record for a first domain name, the first domain name record being associated with a first flag;
    code for storing preferences provided by a subscriber that indicate how to resolve requests that are associated with the subscriber for domain name information from the DNS nameserver, the preferences applying across the plurality of domain names and including a substitution criterion for domain name records associated with the first flag;
    code for receiving a request for domain name information associated with the first domain name and for receiving geographic location information related to the subscriber; code for determining the preferences provided by the subscriber and the first domain name record based on the request;

code for resolving the request for domain name information based on the subscriber information and the first flag by obtaining substitute domain name information that satisfies the substitution criterion, wherein resolving the request for domain name information is based on the geographic location information related to the subscriber, to generate a response to the request for domain name information, the response including substitute domain name information that satisfies the substitution criterion in place of domain name information associated with the first domain name; and code for returning the response to the request for domain name information.

15. The computer program product of claim 14, further comprising: code for receiving subscriber information from a plurality of subscribers, the subscriber information for each subscriber including an indication of how to resolve requests for domain name information associated with one or more flags.

16. The computer program product of claim 15, wherein:

the first flag indicates an association with suspicious activity; and the substitute domain name information is unaffiliated with the first domain name.

17. The computer program product of claim 14, wherein: resolving the request includes obtaining a substitute Uniform Resource Locator that satisfies the substitution criterion.

18. The computer program product of claim 17, wherein the substitution criterion specifies an association between a Uniform Resource Locator in the request for domain name information that appears to be misspelled and the substitute Uniform Resource Locator.

19. The computer program product of claim 17, wherein the substitution criterion specifies an association between a Uniform Resource Locator in the request for domain name information and a referrer identifier in the substitute Uniform Resource Locator.

* * * * *